(12) United States Patent
Seefeld

(10) Patent No.: US 9,995,639 B2
(45) Date of Patent: Jun. 12, 2018

(54) SENSOR ELEMENT, THERMOMETER AS WELL AS METHOD FOR DETERMINING A TEMPERATURE

(71) Applicant: Endress + Hauser Wetzer G,bH + Co. KG, Nesselwang (DE)

(72) Inventor: Peter Seefeld, Pfronten (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 232 days.

(21) Appl. No.: 14/651,295

(22) PCT Filed: Dec. 6, 2013

(86) PCT No.: PCT/EP2013/075788
§ 371 (c)(1),
(2) Date: Jun. 11, 2015

(87) PCT Pub. No.: WO2014/095423
PCT Pub. Date: Jun. 26, 2014

(65) Prior Publication Data
US 2015/0316423 A1    Nov. 5, 2015

(30) Foreign Application Priority Data
Dec. 18, 2012 (DE) .......................... 10 2012 112 574

(51) Int. Cl.
*G01K 7/18* (2006.01)
*G01K 15/00* (2006.01)
(52) U.S. Cl.
CPC .............. *G01K 7/18* (2013.01); *G01K 15/002* (2013.01); *G01K 15/005* (2013.01); *G01K 15/007* (2013.01)

(58) Field of Classification Search
CPC ...... G01K 7/18; G01K 15/002; G01K 15/005; G01K 15/007
(Continued)

(56) References Cited

U.S. PATENT DOCUMENTS 3,826,924 A    7/1974 Plough
3,836,340 A *  9/1974 Conwicke ................. C03C 3/23
                                                         106/1.13
(Continued)

FOREIGN PATENT DOCUMENTS

DE    2300199    7/1973
DE    2251969    4/1974
(Continued)

OTHER PUBLICATIONS

Danner et al., Characterizing Metal-Insulator-Transition (MIT Phase Change Materials (PCM) for RF and DC Micro-Switching Elements, Procedia Engineering 47 (2012) 80-83.*
(Continued)

*Primary Examiner* — Lisa Caputo
*Assistant Examiner* — Nathaniel T Woodward
(74) *Attorney, Agent, or Firm* — Bacon & Thomas, PLLC

(57) ABSTRACT

A sensor element, comprising first and second measuring paths, wherein the first measuring path extends via a first segment of a first material and the second measuring path at least partially extends via this first segment of the first material, wherein the second measuring path extends additionally via a second segment, which is composed of a second material different from the first material.

20 Claims, 3 Drawing Sheets

(58) Field of Classification Search
USPC .............................................................. 374/1
See application file for complete search history.

(56) References Cited

U.S. PATENT DOCUMENTS

| | | | | |
|---|---|---|---|---|
| 3,899,407 | A | | 8/1975 | Eastwood |
| 4,020,443 | A | * | 4/1977 | LeRoy ................... G01K 1/18 338/22 R |
| 9,091,601 | B2 | | 7/2015 | Schalles et al. |
| 2007/0003781 | A1 | * | 1/2007 | de Rochemont ...... B82Y 30/00 428/615 |
| 2008/0106927 | A1 | * | 5/2008 | Celinska ................ H01L 45/04 365/148 |

FOREIGN PATENT DOCUMENTS

| | | | |
|---|---|---|---|
| DE | 2424468 | | 12/1974 |
| DE | 2436911 | | 2/1975 |
| DE | 249355 A1 | | 9/1987 |
| DE | 102010040039 A1 | | 3/2012 |
| FR | 2167565 | | 8/1973 |
| JP | S6454223 A | | 3/1989 |
| JP | S6459022 A | | 3/1989 |
| JP | H01187422 A | | 7/1989 |
| JP | H01187422 A | * | 3/1999 |
| JP | H01187423 A | | 3/1999 |
| WO | 2012046638 A1 | | 4/2012 |
| WO | WO 2012046638 A1 | * | 4/2012 .............. G01K 7/16 |

OTHER PUBLICATIONS

English Translation of the International Preliminary Report on Patentability, WIPO, Geneva, CH, Jul. 2, 2015.
German Search Report, German Patent Office, Munich, DE, dated Sep. 9, 2013.
International Search Report, EPO, The Netherlands, dated Jul. 22, 2014.

\* cited by examiner

SENSOR ELEMENT, THERMOMETER AS WELL AS METHOD FOR DETERMINING A TEMPERATURE

TECHNICAL FIELD

The invention relates to a sensor element, a thermometer, a method for determining a temperature, as well as the use of the method for validation, calibrating, adjusting and/or certification of a thermometer.

BACKGROUND DISCUSSION

Such sensor elements, which are used, for example, for registering a temperature and are made, for example, of a temperature dependent resistor, are applied in a large number of applications, especially in process automation technology.

Thus, for example, known from German patent application, DE 2251969 A is an apparatus for holding temperature constant, in the case of which a transistor is provided as a heating element along with a diode with temperature dependent properties made of a substance having an abnormal jump in its electrical conductivity.

Furthermore, known from Offenlegungsschrift (laid open German patent application), DE 2300199 A is a powdered substance composed of resistive oxides.

Known from Offenlegungsschrift (laid open German patent application), DE 2424468 A is a temperature compensated, thermorelay system, in the case of which a sudden impedance change occurs at a predetermined transition temperature.

Known from German patent, DE 2436911 B is, furthermore, a method for manufacture of thin-film, hot conductor elements based on vanadium oxide, in the case of which there is applied on a suitable substrate a thin layer, which is composed predominantly of a vanadium oxide material, wherein the vanadium oxide material is, furthermore, doped with foreign atoms.

In principle, it is a problem in temperature measurement to assure that the temperature measurement is reliable and that, for example, no aging related drift-effects occur. Additionally, it is a notorious problem in the case of measuring a temperature to validate, adjust, calibrate and/or certify the measuring transducer, i.e. the so-called temperature sensor element. Especially in process automation technology, such sensor elements, such as, for example, thermometers or, generally, apparatuses for determining temperature, are often integrated in the process in such a manner that their removal is often only possible with great effort or special apparatuses, such as, for example, installation assemblies, which are specially adapted for such purpose. For example, Offenlegungsschrift (laid open German patent application), DE 102010040039 A1 is concerned with the problems arising in the adjusting, calibrating or certification of thermometers.

SUMMARY OF THE INVENTION

Starting from the above described state of the art, it is an object of the present invention to enable lastingly stable calibrating, validation, adjusting and/or certification in an especially simple, especially compact, manner.

The object is achieved according to the invention by a sensor element, a thermometer comprising a sensor element, a method for determining a temperature and the use of the method for validation, calibrating, adjusting and/or certification of a thermometer.

As regards the sensor element, the object is achieved by a sensor element, which has first and second measuring paths, wherein the first measuring path extends via a first segment of a first material and the second measuring path extends at least partially via this first segment of the first material, wherein the second measuring path extends additionally via a second segment, which is composed of a second material different from the first material.

The sensor element of the field of the invention can be used, for example, for temperature measurement or for measuring another chemical and/or physical variable. For determining such process variable, the first measuring path, which is composed at least sectionally of a first material, can be used. For example, the first measuring path can be defined via corresponding (signal-)taps, which serve for tapping a measurement signal. Likewise the second measuring path can be formed by corresponding (signal-)taps. Preferably, in such case, the first and second measuring paths are formed in such a manner that the first and second measuring paths at least partially overlap. Especially advantageous, in such case, is when the second measuring path extends at least partially via the first segment as well as also via the second segment, which is composed of a material different from the first material. In this way, an especially compact sensor construction can be achieved. Especially, only a small number of (signal-)taps are required.

In a form of embodiment of the sensor element, the first material is platinum respectively a platinum containing material. Also another material can be used, which has, for example, a temperature dependent resistance value.

In an additional form of embodiment of the sensor element, the second material is a transition metal, preferably vanadium or a vanadium oxide, respectively a transition metal containing material, preferably a vanadium- or a vanadium oxide containing material. The second material can generally be a material, which has a changing physical property as a function of temperature, such as, for example, an electrical property, such as especially electrical conductivity. Especially suitable for such purpose are vanadium containing materials, especially vanadium oxide such as vanadium-II oxide, vanadium-III oxide, vanadium-IV oxide and/or vanadium-V oxide.

In an additional form of embodiment of the sensor element, the first and second measuring paths extend on the same substrate. The substrate is a carrier, on which the measurement paths are, for example, applied. The measuring paths can also be structures applied on the substrate. It is additionally also possible that the measuring paths extend not only on the surface of the substrate, but, instead, also through the substrate or at least partially through the substrate.

In an additional form of embodiment of the sensor element, the first segment and the second segment are thin film and/or thick film layers. These layers have a coating thickness from the nanometer range to the micrometer range.

In an additional form of embodiment of the sensor element, the first and second segments adjoin one another.

In an additional form of embodiment of the sensor element, the material of the second segment experiences a phase transformation at a predetermined temperature. The phase transformation can be accompanied, for example, by a change of a physical property, such as, for example, the electrical conductivity of the material. To exploit the change of this physical property of the material, the change can be detected by sampling, such as, for example, by supplying the second measuring path with a measurement signal. This can take place, for example, parallel to the supplying of the first measuring path with a measurement signal, especially with the same measurement signal. To this end, only an additional tap via the second segment is required. For example, a first and a second tap can be provided on the first segment and a third tap on the second segment. For example, a first measuring path is formed between the first and second taps while a second measuring path is formed between the first and third, respectively the second and third taps.

In an additional form of embodiment of the sensor element, because of the phase transformation of the second material, the second material transfers from a state with a first electrical conductivity into a state with a second electrical conductivity. The change of electrical conductivity can be registered and utilized for detection of the phase transformation. Detection of the phase transformation, in turn, leads to the temperature. This provides a comparison temperature value, i.e. a reference value, in order to adjust, calibrate and/or certify the measurement signals delivered by the sensor element. For example, by registering the phase transformation via the second measuring path, the reliability of the measurement signals obtained via the first path can be checked and, in given cases, corrected.

In an additional form of embodiment of the sensor element, the second material transfers by the phase transformation from a state, in which the second material is electrically essentially an insulator, into an electrically conductive state. The changes of electrical conductivity can, such as mentioned, be taken into consideration for evaluation.

In an additional form of embodiment of the sensor element, the first measuring path is formed by a first resistor tap and the second measuring path by a second resistor tap. The resistor taps can, in such case, such as already explained, be provided on the first segment and on the second segment. These resistor taps can be connected via connecting lines with an evaluating circuit, for example, an evaluating electronics of a measuring device, such as, for example, a thermometer.

In an additional form of embodiment of the sensor element, a third measuring path is provided, which extends at least partially via the first and/or second measuring path, respectively the first and/or second segment, wherein the third measuring path extends additionally via a third segment, which third segment is composed of a third material, which differs from the first and/or second material. The third measuring path, thus, provides a further calibration point, adjustment point, validation- and/or certification point. Because the measuring paths at least partially overlap, by sampling the different measuring paths, i.e. by applying a measurement signal on the measuring paths, the temperature range can be ascertained, for example, the temperature instantaneously reigning in the process.

In an additional form of embodiment of the sensor element, the third segment differs, as regards the doping of the third material, the thickness of the segment and/or the width of the third segment, from the first and/or second segment, respectively the first and/or second material.

In an additional form of embodiment of the sensor element, the segments, i.e. the first, the second and/or the third segment, are arranged next to one another, essentially bordering one another in a plane. The segments can, in such case, be arranged, for example, on the surface of a substrate.

In an additional form of embodiment of the sensor element, the segments, i.e. the first, the second and/or the third segment, are arranged on top of one another, preferably bordering one another. The segments can, in such case, thus, form superimposed layers. Furthermore, an option is that the segments are arranged both next to one another as well as also on top of one another. In this way, a plurality of measuring paths and/or tapping opportunities for the measurement signals can be formed on the sensor element.

The different segments can also be connected via electrically conductive connecting lines with one another, without directly touching one another.

As regards the thermometer, the object is achieved by a thermometer comprising a sensor element according to one of the preceding forms of embodiment. As already mentioned, such a thermometer can include connection lines, which serve for connecting the sensor element to a measuring- and/or operating electronics. Furthermore, the thermometer can include a protective tube, in which the sensor element is arranged. The sensor element can also be a component of a measuring insert, which can be inserted into the protective tube.

As regards the method, the object is achieved by a method for determining temperature, wherein a first measuring path extends via a first segment, which is composed of a first material, wherein a second measuring path is provided, which extends at least partially area the first segment and wherein the second measuring path additionally extends via a second segment, which is composed of a second material, which differs from the first material, wherein a first measurement signal is tapped via the first measuring path and wherein a second measurement signal is tapped via the second measuring path. The method can serve for ascertaining the phase transition and, thus, for ascertaining the temperature. Since this temperature occurs at a known and, above all, reproducible temperature value, this temperature can be used for adjusting, calibrating and/or certification of the measurement signal tapped via the first measuring path. The first measuring path serves thus, generally, for example, for providing a measurement signal corresponding to a temperature. The first measuring path is composed for this purpose, such as already explained, preferably of a temperature dependent resistor. For producing the first and second measurement signals, the first and second measuring paths can be supplied with a corresponding measurement signal. The first and second measuring paths are located, in such case, preferably on the same substrate.

As regards the use, the object is achieved by the use of the method for validation, calibrating, adjusting and/or certification of a thermometer.

The proposed sensor element can, thus, be used for self-monitoring of a thermometer. This enables a temperature monitoring apparatus, which includes the proposed sensor element. The sensor element can, in such case, be composed of a number of thin film coatings, which have a thickness between 0.5 μm and 20 μm. These thin film coatings can be placed on a dielectric substrate, such as, for example, an aluminum oxide containing ceramic or a so-called low temperature compound or a high temperature compound. The layers adjoin, respectively overlap, in such case, preferably directly at their respective edges.

It is also provided that doped and undoped, thin film layers of vanadium oxides can overlap, wherein at least one of the vanadium oxide containing, thin film layers is in electrically conductive contact on the same substrate with at least one other metal thin film layer. Furthermore, also one or more first measuring paths of a temperature dependent, resistance element can be provided on the same substrate. Adjoining conductively by means of direct layer contact on this thin-film segment, respectively on these thin film segments, can be thin film segments of vanadium oxide. In such case, the thin-film segment, on which the first measuring path is located, can, same as the thin-film segment, on which the second measuring path is located, be electrically contacted with two or more connections, wherein at least one tap for determining the electrical resistance extends via the first thin-film segment, which has a temperature dependent resistor and wherein at least one further tap is provided on the second thin-film segment, which experiences a phase transition at a predetermined temperature.

The tapping can be, for example, by way of electrical contacts, which are preferably led on the edges of the substrates, respectively on the edge of the first, respectively the second, measuring path, respectively on the edge of the first and/or the second segment.

The first measuring path is, in such case, preferably embodied as a meander-shaped measuring path, for example, in the form of a structure applied on the substrate. The substrate can have front- and rear sides, wherein, on the rear-side of the preferably dielectric substrate, a number of step shaped, superimposed, vanadium oxide layers with different doping are arranged. Instead of the different doping, also a different thickness and/or width of the vanadium oxide layers can be provided. By this layered, respectively step shaped, construction, a measurement signal of around 40 to 10,000 ohm can be present, so that at the respective phase transformation temperatures a stepped resistance change occurs.

Instead of the layered construction, also a coordinated construction of the segments can occur, in the case of which on the rear-side of the dielectric substrate a number of parallelly connected layers of, for example, different doping are arranged next to one another. These layers can, for example, be contacted edgewise, so that at a temperature change over the respective phase transformation temperatures a clear, step shaped increase, respectively decrease, of the resulting total resistance of the arrangement occurs.

Vanadium oxide, respectively vanadium oxide thin film, refers to a vanadium oxide, respectively vanadium oxide film, having a determined stoichiometric vanadium to oxygen ratio. Such a material has undoped upon heating from low temperatures to a region of around 60° C. a crystal structure related changing from a dielectric, virtually semi-conducting state into a state with electrical conductivity, this meaning thus a resistance change transpires. Upon cooling from temperatures above 60° C., the reversed occurs, which brings about a resistance increase. By means of doping additives, different transformation temperatures can be achieved. For example, a doping by means of tungsten, niobium, molybdenum, phosphorus, or fluoride can occur, in order to shift the transformation temperature to under 60° C. Furthermore, a doping with titanium, tin, aluminum or gallium can occur, in order to shift the transformation temperature to above 60° C. Possible in such case are also dopings and mixtures of dopings of a variety of the mentioned elements.

The proposed sensor element, respectively the thermometer, which includes such a sensor element, provides an in-situ monitoring of the resistance temperature measurement. Furthermore, a number of reference temperatures distributed over a measuring range can be provided, which can be established by different doping additives and/or doping ratios. Such a miniaturized, respectively semi miniaturized, form of construction can be applied in currently used thermometer assemblies.

The object is, furthermore, achieved by a sensor element, wherein the sensor element includes a measuring path, which is composed of at least two segments bordering one another. The segments are preferably of different materials, wherein at least one of the segments has a phase transformation temperature in a range relevant for validation, adjusting, calibrating and/or certification of the sensor element.

In a form of embodiment of this sensor element, the sensor element includes a first measuring path, which serves for determining temperature based on a temperature dependent resistance element, wherein the sensor element additionally includes a second measuring path, which is composed of at least two segments bordering one another, which segments are preferably of different materials, wherein at least one of the segments has a phase transformation temperature in a range relevant for validation, adjusting, calibrating and/or certification of the first measuring path, i.e. of the temperature dependent resistance element.

The forms of embodiment for this sensor element can be assembled based on the sensor elements discussed above.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
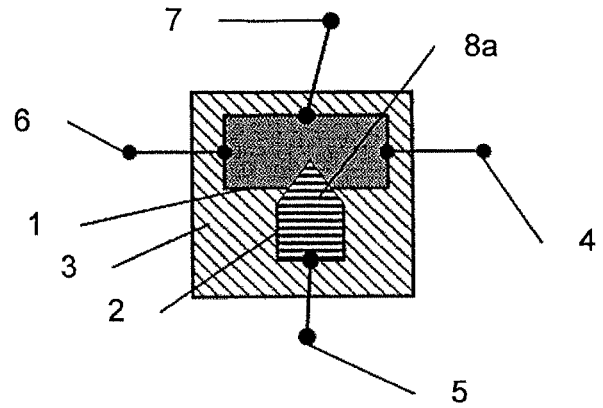
FIG. 1 is a schematic representation of a sensor element in a form of embodiment of the proposed invention.

FIG. 1 shows first and second measuring paths applied on a substrate 3. To this end, a first thin-film segment 1 and a second thin-film segment 2 are applied on the substrate 3. These two thin film segments 1, 2 border directly on one another, respectively overlap. The first measuring path extends, in such case, completely via the first thin-film segment 1 from a first to a second tap 4, 6, which are connected with the first thin-film segment 1. Located between these first and second taps 4, 6 is thus the first measuring path. The second measuring path is located between a third and a fourth tap 7, 5 on the substrate 3. The third tap 7 is likewise connected with the first thin-film segment 1, while the fourth tap 5 is provided on the second thin-film segment 2. The material of the first thin-film segment 1 is platinum according to the present example of an embodiment, while the material of the second thin-film segment 2 is preferably vanadium, respectively vanadium oxide. Due to the known phase transformation temperature of the second thin-film segment 2 an option in the case, for example, of an abrupt rise of the electrical conductivity along the second measuring path is to obtain a reference temperature, namely the phase transformation temperature of the second thin-film segment 2, as reference point for validation, adjusting, calibrating and/or certification of the temperature signal obtained by means of the first measuring path. The substrate 3 can be, for example, a ceramic containing aluminum oxide.

For example, for manufacture of such a sensor element, there can be applied, first of all, the first thin-film segment 1 on the substrate 3 and then the second thin-film segment 2 on the substrate 3 and, in such case, at least sectionally overlapping the first thin-film segment 1. This overlap is designated by the reference character 8a in FIG. 1.

Figure 2:
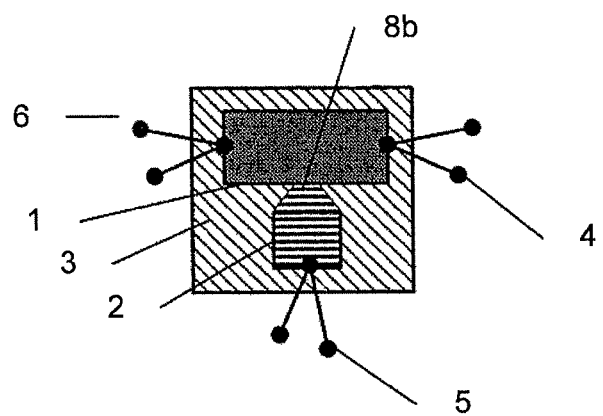
FIG. 2 is another form of embodiment of a sensor element according to the proposed invention.

FIG. 2 shows a form of embodiment of the proposed sensor element, wherein the first measuring path is contacted by a four point measurement signal tap 4, 6. The second measuring path can, in such case, be formed partially between the first tap and the second tap of the four point measurement arrangement 4, 6. Likewise as in the form of embodiment according to FIG. 1, in this case, the first thin-film segment 1 is in electrically conductive contact with the second thin-film segment 2. In the form of embodiment according to FIG. 2, a validation, adjusting, calibrating and/or certification of the measurement signals of the sensor element can be performed by providing only three signal taps 4, 6, 5 on the sensor element.

For manufacturing a sensor element as shown, for example, in FIG. 2, first of all, the second thin-film segment 2, which experiences a phase transition at a predetermined and known temperature, is first applied on the substrate 3 and then the first thin-film segment 1 is applied on the substrate 3, wherein the first thin-film segment 2 is applied in such a manner on the substrate 3 that it at least sectionally overlaps the second thin-film segment 2. This region of overlap is designated in FIG. 2 with reference character 8b.

Figure 3:
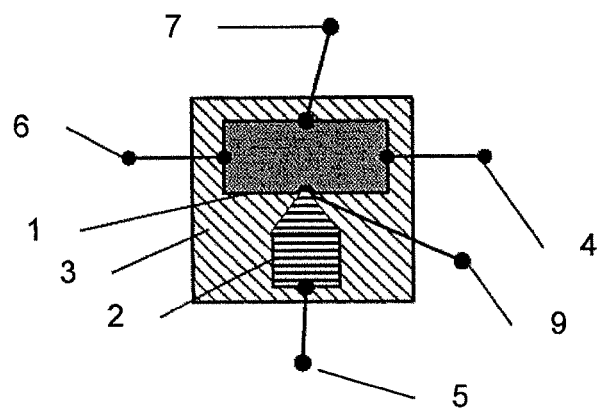
FIG. 3 is another form of embodiment of a sensor element according to the proposed invention.

FIG. 3 shows another form of embodiment of the proposed invention, in the case of which the first and second thin-film segments 1, 2 do not overlap but instead are connected edge-to-edge with one another. Additionally, such as shown, for example, in FIG. 3, a tap 9 can be provided for tapping a measurement signal via the second measuring path or via the first measuring path at a contact point between the first and second thin-film segments 1, 2. A further contact point 5 can be provided, for example, according to the example of an embodiment in FIG. 3, especially at an oppositely lying end of the second thin-film segment 2. Other taps 4, 6, 7 can be provided, for example, on the first thin-film segment 1, in order to tap a measurement signal, with which the first thin-film segment 1 is supplied.

Figure 4:
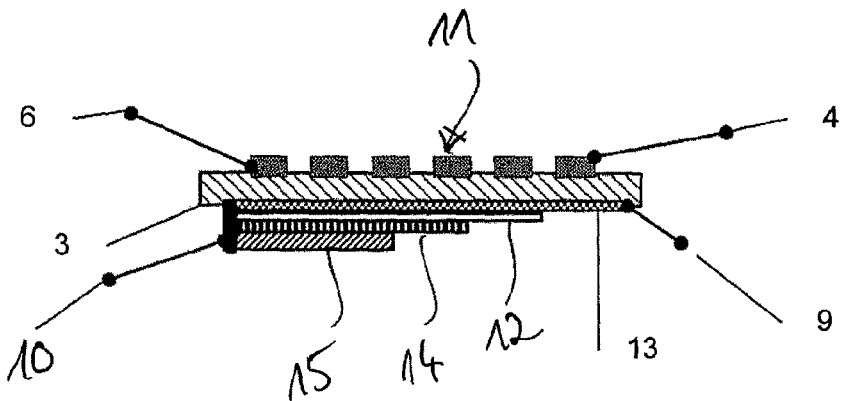
FIG. 4 is a cross section through a form of embodiment of the sensor element according to the proposed invention.

FIG. 4 shows a cross section through another form of embodiment of the sensor element according to the proposed invention. In such case, the first measuring path is located on a front side of the substrate 3 while a second measuring path is located on the side of the substrate 3 lying opposite the front side, i.e. the rear-side of the substrate 3. The first measurement path can, in such case, such as shown in FIG. 4, be composed of a meander shaped measurement resistor mounted on the front side between the taps 4 and 6, while on the rear-side of the substrate 3 a number of layers 12, 13, 14, 15 of thin-film segments are arranged on top of one another. The layers 12, 13, 14, 15 are, in such case, such as shown in FIG. 4, connected electrically conductively with one another via a conductive trace like contact 10. The layers 12, 13, 14, 15 can, in such case, be preferably of a vanadium oxide having different dopings, different thicknesses or widths, so that at the respective transformation points of the respective layers 12, 13, 14, 15 a stepped resistance change occurs between the contact point 9 on the layer 13 and a second (conductive trace like) tap 10. Preferably according to the example of an embodiment in FIG. 4, the deepest layer 13 has the lowest phase transformation temperature, while the layers 12, 14, 15 lying over the layer 13 have successively higher phase transformation temperatures.

Instead of the point shaped tap 9 on the layer 13, likewise a conductive trace like tap, which contacts all layers 12, 13, 14, 15, can be provided.

Figure 5:
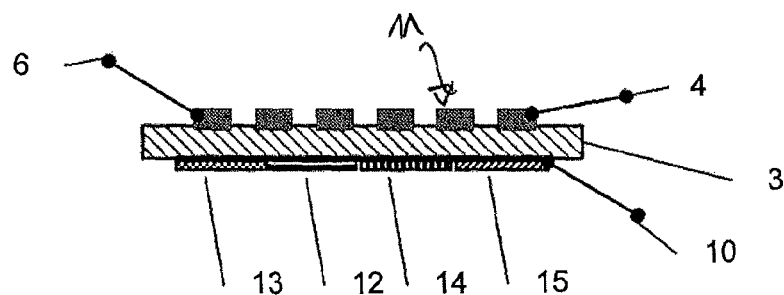
FIG. 5 is a cross section through another form of embodiment of the sensor element according to the proposed invention.

The first and second measuring paths, in such case, do not overlap. Rather, there is provided besides the first measuring path, for example, on the front side of the substrate, a second measuring path, for example, on the rear-side of the substrate or alongside the first measuring path on the front side of the substrate. The second measuring path is composed, in such case, of segments, such as, for example, layers, which have phase transitions at different temperatures. These segments adjoin one another, preferably as shown in FIG. 4 or FIG. 5. Thus, they lie preferably next to one another, respectively on top of one another, so that a step shaped curve, for example, of the resistance or some other measured variable arises between first and second taps as a function of temperature, respectively the visited temperature range.

FIG. 5 shows a cross section according to an additional form of embodiment of the sensor element, in the case of which a meandering resistance element 11 is likewise applied on the front side of the substrate 3, wherein the rear-side of the substrate 3 has thin film segments 12, 13, 14, 15 arranged next to one another, which can be sampled with a measurement signal via an electrical tap 10. The segments 12, 13, 14, 15 are connected with one another via the conductive trace like tap 10. The conductive trace like tap 10 is, in turn, separated from a second conductive trace like tap via the segments 12, 13, 14, 15. As a function of temperature, respectively, consequently, the phase of the segments 12, 13, 14, 15, a changing electrical conductivity results between the taps 10.

Figure 6:
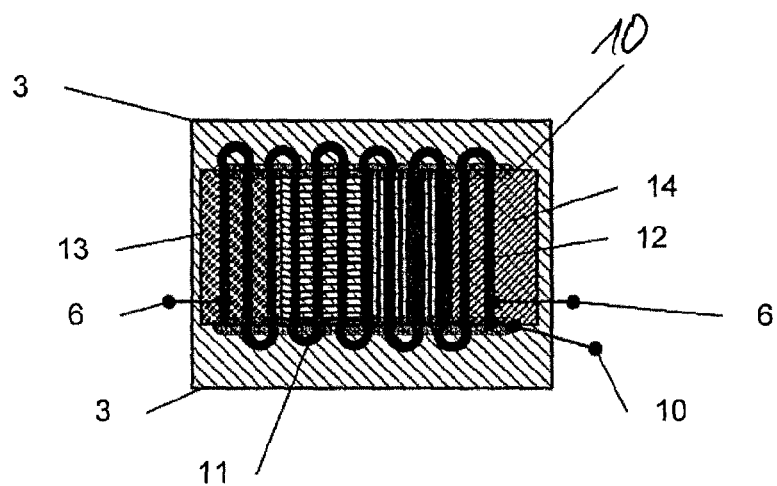
FIG. 6 is a schematic representation of a form of embodiment according to the proposed invention, in a plan view.

FIG. 6 shows another form of embodiment of the sensor element in a plan view onto the front side of the substrate 3, wherein for purposes of illustration also the segments 12, 13, 14, 15 arranged on the rear-side are shown. Arranged next to one another on the rear-side of the dielectric substrate 3 are a plurality of parallelly connected, differently doped, thin film layers, which are, in each case, contacted with one another edgewise via conductive trace like taps 10, so that at a temperature change via the particular transformation temperature, i.e. phase transformation temperature, a clear, stepped increase, respectively decrease, of the resulting total resistance across the thin film layers can be detected.

Also in this example of an embodiment, the first measuring path and the second measuring path extend separated from one another, the first measuring path via the meandering conductive trace 11 and the second measuring path between the taps 10 separated by the segments 12, 13, 14, 15.

Figure 7:
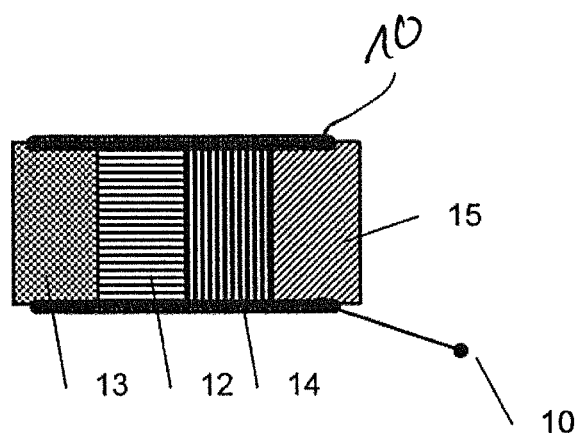
FIG. 7 is a schematic representation a number of segments between a first and a second tap for tapping a measurement signal.

FIG. 7 shows a cross section through a number of segments 12, 13, 14, 15 arranged next to one another between first and second conductive trace like taps 10. The segments 12, 13, 14, 15 are of materials, which experience phase transitions at determined temperatures, upon which the electrical properties of the respective materials change. In such case, the temperatures, at which the phase transitions in the segments occur, preferably differ from one another, so that a stepped curve, for example, of the resistance, or some other electrical variable of the measurement signal tapped between the first and second taps 10, results.

The invention claimed is:

1. A sensor element, comprising:
a first measuring path; and
a second measuring path, wherein:
said first measuring path extends via a first segment of a first material, and said second measuring path at least partially extends via said first segment of the first material; and
said second measuring path extends additionally via a second segment, which is composed of a second material different from said first material,
said material of said second segment experiences a phase transformation at a predetermined temperature, and
said second material transfers by the phase transformation from a state, in which said second material is electrically an insulator, into an electrically conductive state.

2. The sensor element as claimed in claim 1, wherein:
said first material is platinum, respectively a platinum containing material.

3. The sensor element as claimed in claim 1, wherein:
said second material is a transition metal.

4. The sensor element as claimed in claim 1, wherein:
said first and second measuring paths extend on the same substrate.

5. The sensor element as claimed in claim 1, wherein:
said first segment and said second segment are thin film or thick film layers.

6. The sensor element as claimed in claim 1, wherein:
said first and second segments adjoin one another.

7. The sensor element as claimed in claim 1, wherein:
because of the phase transformation of said second material, said second material transfers from a state with a first electrical conductivity into a state with a second electrical conductivity.

8. The sensor element as claimed in claim 1, wherein:
said first measuring path is formed by a first resistor tap; and
said second measuring path by a second resistor tap.

9. The sensor element as claimed in claim 1, wherein:
a third measuring path is provided, which extends at least partially via said first and/or said second measuring path, respectively said first and/or said second segment; and
said third measuring path extends additionally via at least a third segment; which is composed of a third material, which differs from said first and/or said second material.

10. The sensor element as claimed in claim 9, wherein:
said third segment differs as regards doping of the third material, its thickness and/or its width as compared with said second segment.

11. The sensor element as claimed in claim 9, wherein:
said segments are arranged next to one another bordering one another in a plane.

12. The sensor element as claimed in claim 9, wherein:
said segments are arranged on top of one another bordering one another.

13. The sensor element as claimed in claim 1 wherein:
said second material is a material containing vanadium or a vanadium oxide.

14. A thermometer, comprising:
a sensor element, comprising: a first measuring path; and a second measuring path, wherein: said first measuring path extends via a first segment of a first material, and said second measuring path at least partially extends via said first segment of the first material; and said second measuring path extends additionally via a second segment, which is composed of a second material different from said first material, wherein:
said material of said second segment experiences a phase transformation at a predetermined temperature; and
said second material transfers by the phase transformation from a state, in which said second material is electrically an insulator, into an electrically conductive state.

15. A method for determining a temperature, comprising:
a first measuring path, which extends via a first segment, composed of a first material;
a second measuring path, which extends at least partially via the first segment, said second measuring path extends additionally via a second segment, composed of a second material, which differs from the first material;
tapping a first measurement signal via said first measuring path; and
tapping a second measurement signal via said second measuring path, wherein:
said material of said second segment experiences a phase transformation at a predetermined temperature; and
said second material transfers by the phase transformation from a state, in which said second material is electrically an insulator, into an electrically conductive state.

16. The use of a method for determining a temperature comprising:
providing a first measuring path, which extends via a first segment, composed of a first material; providing a second measuring path which extends at least partially via the first segment, said second measuring path extends additionally via a second segment, composed of a second material, which differs from the first material;
tapping a first measurement signal via said first measuring path; and
tapping a second measurement signal via said second measurement path, wherein:
said material of said second segment experiences a phase transformation at a predetermined temperature; and
said second material transfers by the phase transformation from a state, in which said second material is electrically an insulator, into an electrically conductive state,
the use comprising:
validation, calibration, adjusting and/or certification of a thermometer.

17. A sensor element, including:
a measuring path, which is composed of at least two segments bordering one another, which segments are of different materials, wherein:
at least one of said segments has a phase transformation temperature in a range relevant for validation, adjusting, calibrating and/or certification of the sensor element;
the material of one of said at least two segments experiences said phase transformation at a predetermined temperature; and
the material of the other of said two segments transfers said transformation from a state, in which said material of the other of said two segments is electrically an insulator, into an electrically conductive state.

18. The sensor element as claimed in claim 17, wherein:
said at least a first segment and also said at least a second segment experience a phase transition in the range relevant for the validation, adjusting, calibrating and/or certification of the sensor element.

19. The sensor element as claimed in claim 18, wherein:
said segments differ as regards their properties having different materials, and different strength and/or width, respectively thickness.

20. The sensor element as claimed in claim 17, wherein:
said measuring path has a first measuring path, which serves for determining temperature based on a temperature dependent resistance element and a second measuring path, which is composed of at least two segments bordering one another, which segments are of different materials; and at least one of the segments has a phase transformation temperature in a range relevant for validation, adjusting, calibrating and/or certification of the first measuring path, i.e. of the temperature dependent resistance element.

* * * * *